Figure 4:
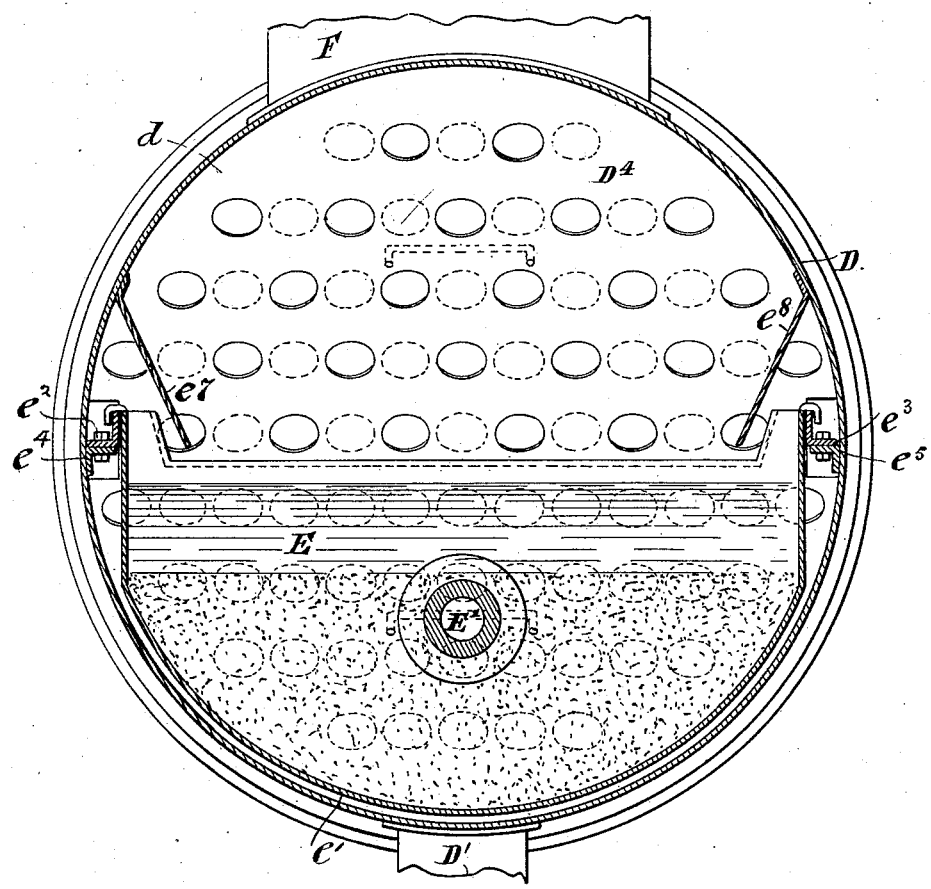

(No Model.) 5 Sheets—Sheet 1.
J. PATTEN.
APPARATUS FOR CONCENTRATING SOLUTIONS.
No. 452,507. Patented May 19, 1891.
Fig. 2
Fig. 1
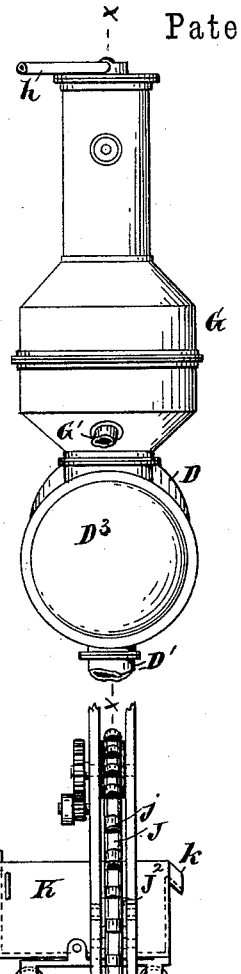
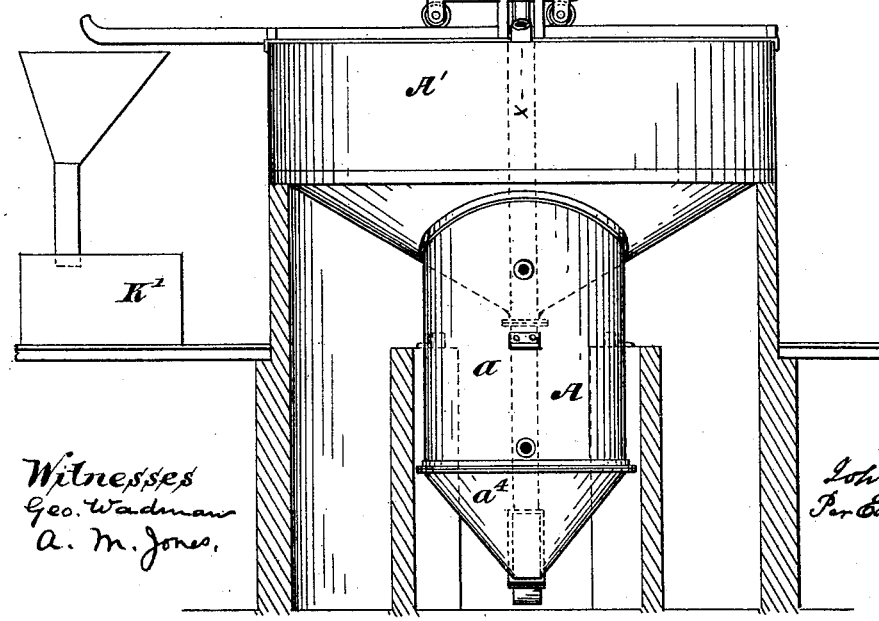
Witnesses
Geo. Wadman
A. M. Jones.
Inventor
John Patten
Per Edw. E. Ewing
Atty.
THE NORRIS PETERS CO., PHOTO-LITHO., WASHINGTON, D. C.

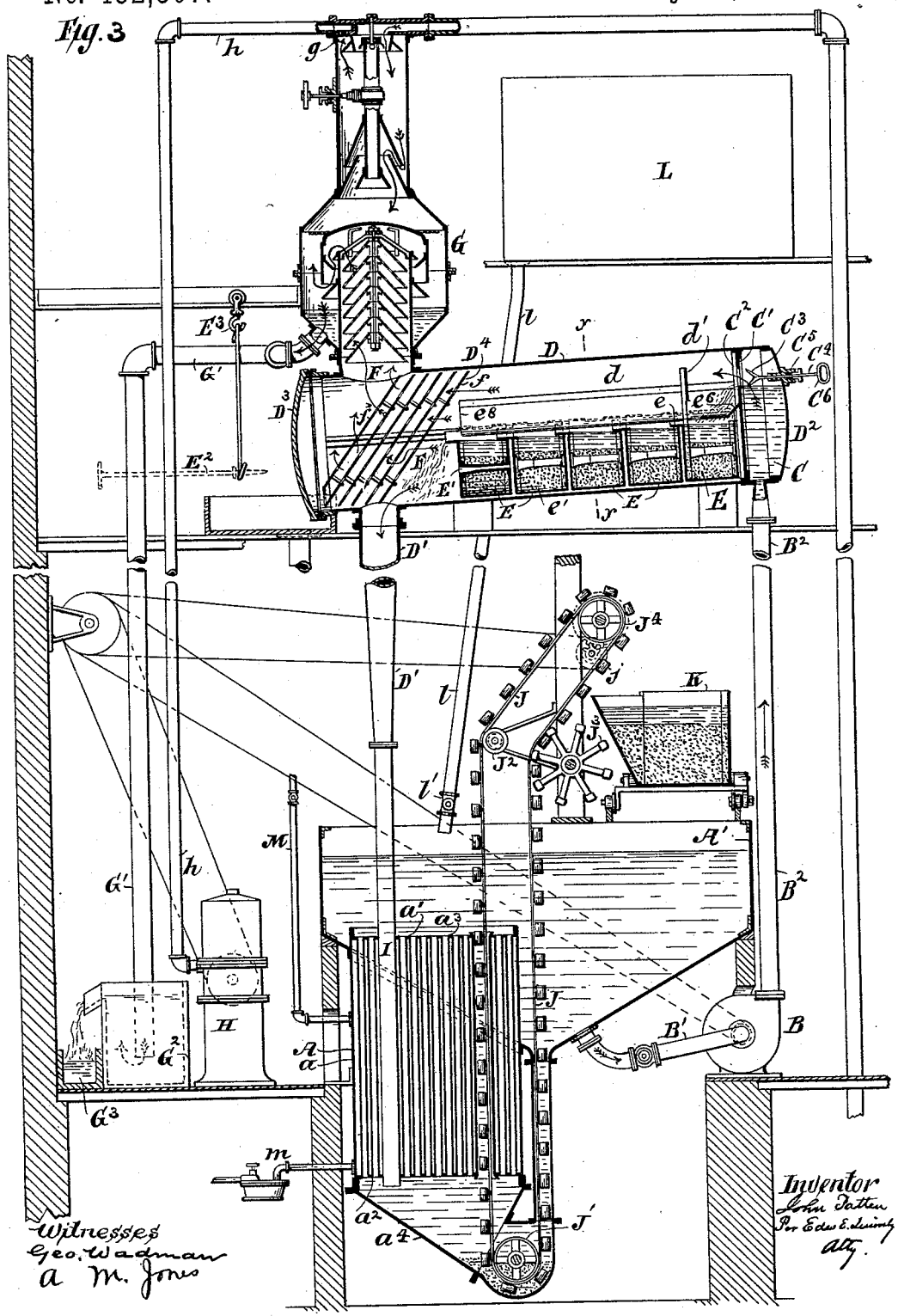

(No Model.) 5 Sheets—Sheet 3.
J. PATTEN.
APPARATUS FOR CONCENTRATING SOLUTIONS.
No. 452,507. Patented May 19, 1891.

Witnesses
Geo Wadman
A. M. Jones

Inventor
John Patten
Per Edw. E. Dainty
Atty.

(No Model.) 5 Sheets—Sheet 4.
J. PATTEN.
APPARATUS FOR CONCENTRATING SOLUTIONS.
No. 452,507. Patented May 19, 1891.

Witnesses
Geo. Wadman
A. M. Jones

Inventor
John Patten
Per Edw. E. Lumly
Atty.

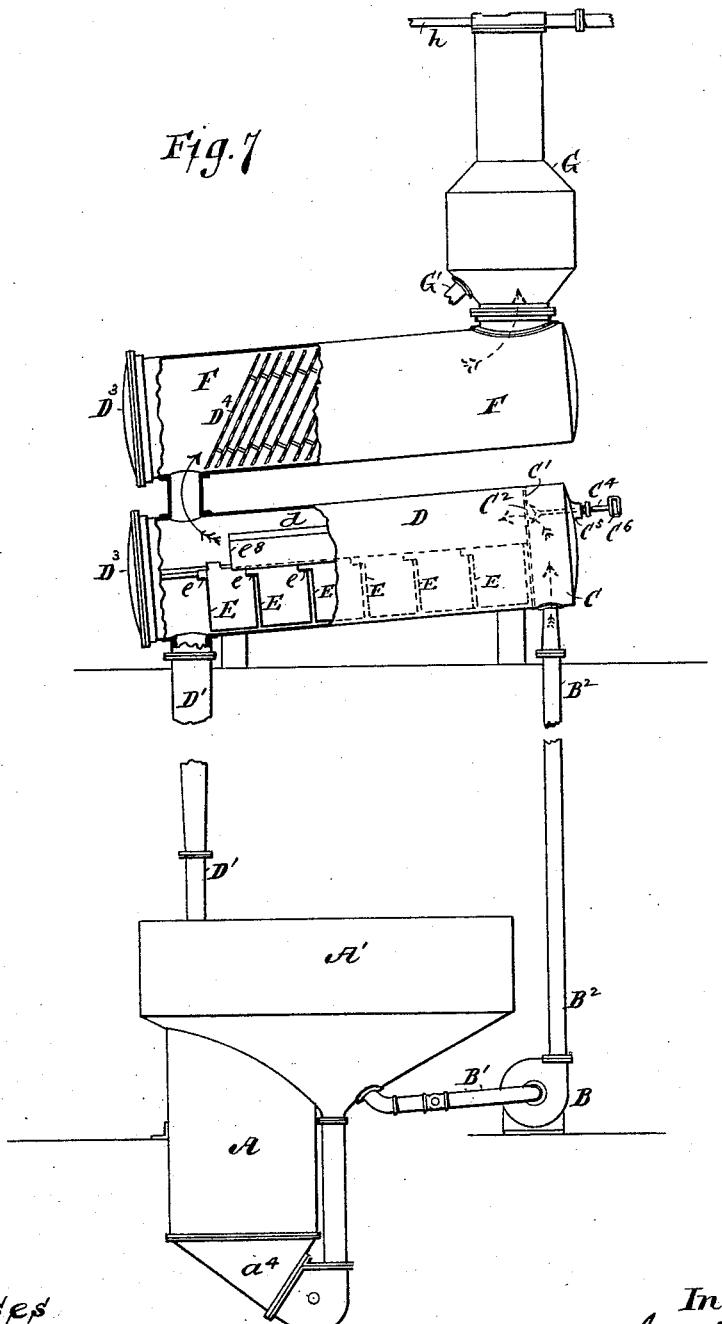

UNITED STATES PATENT OFFICE.

JOHN PATTEN, OF NEW YORK, N. Y.

APPARATUS FOR CONCENTRATING SOLUTIONS.

SPECIFICATION forming part of Letters Patent No. 452,507, dated May 19, 1891.

Application filed May 9, 1890. Serial No. 351,136. (No model.)

*To all whom it may concern:*

Be it known that I, JOHN PATTEN, of the city and State of New York, have invented certain Improvements in Apparatus for Concentrating Solutions and Separating their Constituents, of which the following is a specification.

The improved apparatus herein described may be effectively employed in manufacturing crude glycerine from suitably-prepared soap-lye by concentrating such soap-lye, evaporating the water therefrom, and effecting the crystallization and separation therefrom of the salt it may contain.

The invention consists, broadly, in the combination of a heater heated internally by steam and connected at its upper end with the bottom of a receiving-vat, an evaporating-chamber elevated thirty-three feet (more or less) above the top of said receiving-vat, in order that a Torricellian vacuum may be maintained in the evaporating-chamber, a pump with suitable pipe connections for pumping liquid from the said receiving-vat upward to the said evaporating-chamber, a drain-pipe extending from the lower part of said evaporating-chamber to said heater for returning any unevaporated liquid to said heater, and thus keeping such liquid in circulation, a condenser connected with said evaporating-chamber, and an air-pump connected with said condenser, whereby a vacuum is maintained in said condenser and evaporating-chamber. By continued circulation through the evaporating-chamber the soap-lye which has been previously subjected to the usual chemical treatment is gradually concentrated and separated into its constituent parts by the crystallization and precipitation from it of its salt and the evaporation from it of its water, the vapor of which is drawn off into the condenser, and there condensed, while the remaining crude glycerine is returned through the drain-pipe to the receiving-vat. The precipitated salt is preferably caught in removable tanks arranged upon the bottom of the evaporating-chamber, which is provided with a detachable head or door for permitting the removal of the tanks from the evaporating-chamber at the conclusion of the operation concurrently with the removal of the crude glycerine from the receiving-vat preparatory to a renewal of the operation upon another lot of soap-lye. The soap-lye in the receiving-vat and heater is usually heated to a temperature of from, say, 100° to 240° Fahrenheit, according to the state of concentration of the soap-lye and perfection of the vacuum, a higher temperature being avoided in order that the glycerine itself may not vaporize in vacuo when pumped up into the evaporating-chamber.

Figure 5:
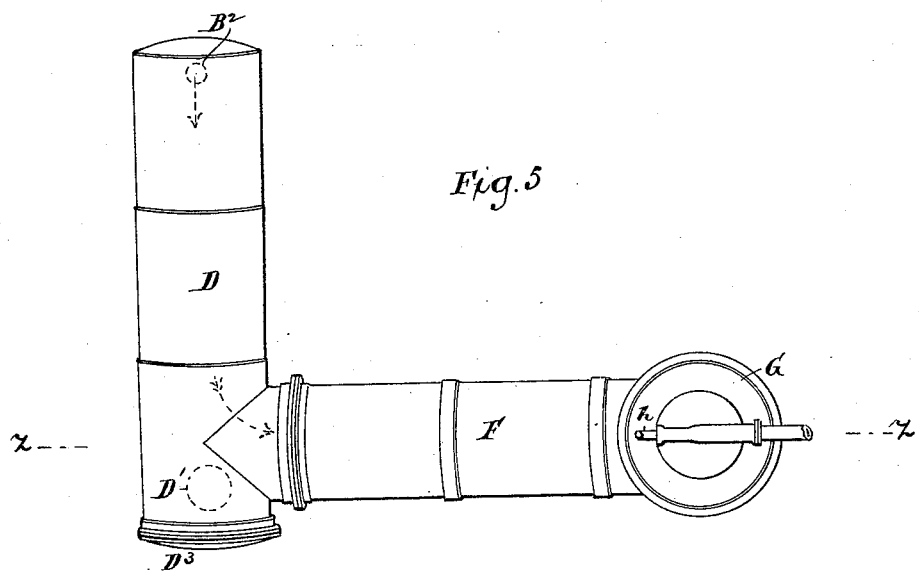
Figure 6:
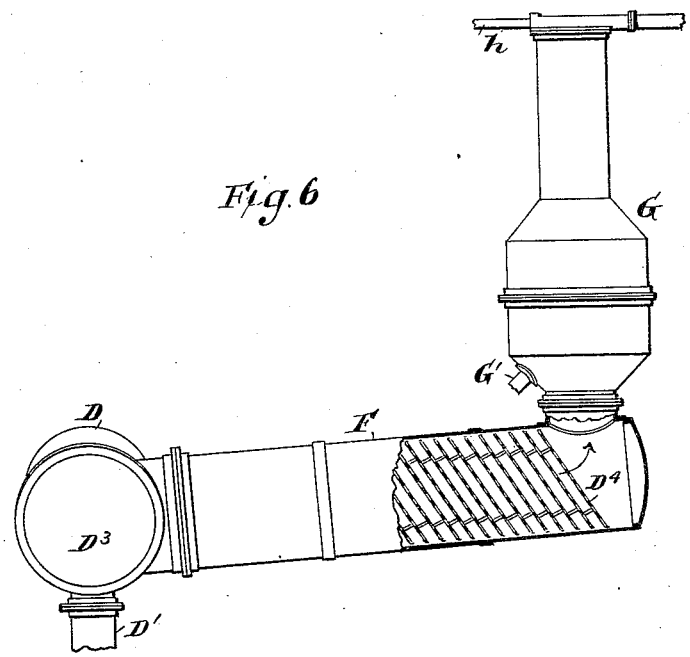

Various features of construction and peculiarities in the mode of operation of the apparatus will be more readily understood after a consideration of it in detail, as illustrated in the accompanying drawings, which are as follows:

Figure 1 is an elevation of the heater and receiving-vat. Fig. 2 is an elevation of the evaporating-chamber and condenser. Fig. 3 is an elevation, partly in section, through the plane indicated by the dotted lines $x$ $x$ on Figs. 1 and 2, with portions of the vertical pipes broken away, but in other respects representing the various parts of the apparatus grouped in suitable relation to each other. Fig. 4 is a transverse section of the evaporating-chamber, taken through the plane indicated by the dotted line $y\,y$ on Fig. 3. Fig. 5 is a top view of a modified construction in which the evaporating-chamber is connected with a lateral scrubbing-chamber. Fig. 6 is an elevation, partly in section, taken through the plane indicated by the dotted line $z\,z$ on Fig. 5. Fig. 7 is an elevation, partly in section, of another modified construction, in which the scrubbing-chamber is erected upon the top of the evaporating-chamber.

The apparatus illustrated in the drawings is therein represented as contained within a suitable building, portions of which are shown in section. The heater A, erected upon a substantial foundation in the first story or cellar of the building, is composed of the vertical cylinder $a$, provided with horizontal tube-sheets $a'$ $a^2$ and with the group $a^3$ of vertical tubes, the opposite ends of which are inserted in the tube-sheets $a'$ and $a^2$, respectively. The cylinder $a$ is provided with a well $a^4$ at the bottom, and has its open upper end inserted in the conical bottom of the receiving-vat A'. The pump B is connected by its induction-pipe B' with the receiving vat A' and by its induction-pipe $B^2$ with the chamber C, formed within the higher end of the inclined cylinder D by the erection therein of the diaphragm C'. The drain-pipe D' extends from the lower end of the inclined cylinder D to the heater A.

Liquid is discharged from the receiving-chamber C through the orifice $C^2$ into the evaporating-chamber $d$ within the inclined cylinder D. Any deposit which may collect within the orifice $C^2$ is removed by reciprocating the scraper $C^3$, which is affixed to the end of the stem $C^4$, extending through a suitably-packed bearing $C^5$ in the head $D^2$ of the cylinder D, and provided at its outer end with the handle $C^6$. The liquid discharged through the orifice $C^2$ into the evaporating-chamber $d$ is projected against the deflecting-plate $d'$, down which it falls by the influence of gravity into the first salt-tank E, which is one of a series of similar tanks arranged side by side within the inclined cylinder D. When the tank E becomes full, the liquid overflows across the chute $e$ into the next lower tank, and so on. The liquid overflowing from the last tank of the series falls into the mouth of the drain-pipe D', by which it is conducted back to the heater. The water contained in the liquid introduced into the evaporating-chamber $d$ vaporizes rapidly in consequence of the vacuum therein maintained, and the liquid consequently soon reaches the graining-point, at which the salt present in it crystallizes and is precipitated. The salt thus precipitated is caught in the salt-tanks and displaces the liquid therein contained, causing it to overflow from one tank to another, as described. When the tanks have become filled with salt, the pump is stopped, and the head $D^3$, together with the group of inclined scrubbing-plates $D^4$, having been withdrawn from the cylinder D, the tanks are successively removed from the cylinder, and having been emptied of their contents are replaced therein.

As will be seen on reference to Fig. 4, the tanks have round bottoms $e'$, and are provided at their opposite sides with the angle-plates $e^2$ and $e^3$, by means of which the tanks are suspended upon the inwardly-projecting wings of the angle-plates $e^4$ and $e^5$, bolted to the interior of the cylinder D. As is also shown in Fig. 4, the sides of the tanks are higher than their ends. The inwardly and downwardly inclined plate $e^6$, bolted to the diaphragm C', directs any drip from the orifice $C^2$ into the first tank. Similarly-inclined plates $e^7$ and $e^8$, bolted to and extending longitudinally along the side walls of the evaporating-chamber $d$, serve to direct any falling spray into the tanks and to shield the side flanges, and thus prevent any considerable deposit of salt thereon.

To facilitate the removal of the salt-tanks from the cylinder D, each tank has inserted transversely through it the slightly-tapering tube E', with its ends secured in the opposite side walls of the tank and with its larger end toward the head $D^3$. As will be seen, the tube E' is arranged in such position that it is near the center of gravity of the loaded tank.

To remove the salt-tanks from the cylinder D, a bar $E^2$, having a taper corresponding to the taper of the tube E', is driven into the tube E' until it jams, and force being applied to the bar $E^2$ the tank is pulled out of the cylinder, and by means of a crane $E^3$, or other suitable instrumentality, is moved to the place where it is to be emptied. The tapering bar $E^2$ may be small enough to extend entirely through the tube E' and project a sufficient distance from both ends of the tube to enable its projecting portions to serve as trunnions, to which the hooks of two crane-chains may be attached, if desired.

The vapor may be drawn from the evaporating-chamber $d$ through a suitable outlet into a separate scrubbing-chamber containing a series of perforated diaphragms and sieves of progressively-increasing fineness of mesh, or such diaphragms $f$ and sieves $f'$ may be detachably erected in the lower end of the cylinder D, as shown in Fig. 3. If there is any foaming of the material under treatment, the bubbles will be broken by collision with the scrubbing-plates or sieves, and the liquid originally composing the shells of the bubbles will under the influence of gravity be made to ultimately run back into the drain-pipe D'.

The system of scrubbing-plates, instead of being arranged in the lower end of the cylinder D, may be arranged in a separate chamber either extending laterally from the cylinder D, as illustrated in Figs. 5 and 6, or erected upon the top thereof, as illustrated in Fig. 7; or, as shown in Fig. 3, the scrubbing devices may consist of a series of vertically superposed cones erected within a vertical cylindrical scrubbing-chamber F, extending upward from the top of the cylinder D into the lower portion of the condenser G.

In apparatus of large dimensions it will be preferable to provide a scrubbing-chamber separate from the cylinder D, and thus avoid the use of the group of scrubbing-plates $D^4$ requiring to be removed when the head $D^3$ is taken off to allow access to the cylinder D for the withdrawal of the tanks E. From the scrubbing-chamber the vapor is drawn into the condenser G, where it is condensed by being brought into direct contact with cold water, which is continuously injected into the condenser, and which, together with the water of condensation, falls by the influence of gravity therefrom through the drain-pipe G' into the cistern $G^2$, the top of which is at such distance below the bottom of the condenser that the weight of the column of water in the drain-pipe G' will counterbalance the pressure of the atmosphere upon the surface of the water contained in the cistern $G^2$. From the cistern $G^2$ the water overflows into the waste-trough $G^3$. A vacuum is maintained in the condenser, and hence in the scrubbing-chamber F and in the evaporating-chamber $d$, by means of the vacuum-pump H, the induction-pipe $h$ of which is connected with the exhaust-outlets $g$ of the condenser.

Various well-known forms of condensers and vacuum-pumps may be used in combination with the heater and elevated evaporating-chamber herein described without departing from the present invention, it being of course understood that it is desirable to use an effective condenser and that the more effective the vacuum-pump is in maintaining a high vacuum the more perfectly the remainder of the apparatus will work.

In practice it may in some cases be desirable to concentrate the soap-lye to a density near its graining-point before introducing it into the receiving-vat, which may be done by boiling it in an open vessel. Ordinarily, however, it will be preferable to effect such concentration in the evaporating-chamber of the present apparatus.

When properly-treated soap-lye has been concentrated to a density of, say, 24° Baumé, the salt in it begins to crystallize and precipitate. When the salt-tanks are employed, the precipitate continues to collect in them until they are full, after which, of course, all the salt crystals are carried back in the liquid returned through the drain-pipe D'. The lower part of the drain-pipe D' extends downward through the large tube I, and hence discharges any crystals of salt drained from the cylinder D into the well $a^4$, at the bottom of the heater, thereby guarding such crystals from contact with the hot surfaces of the heating-tubes upon which they would otherwise be likely to adhere.

In dealing with soap-lyes which foam violently a considerable proportion of the salt-crystals is always carried back through the drain-pipe D' to the bottom of the heater and requires removal therefrom. There are various expedients in common use by which such removal can be effected. Thus, the well $a^4$ may be provided with ordinary test-cocks or discharge-valves for testing or drawing out its contents. Inasmuch, however, as the heater will usually be in the basement or cellar of the building in which the apparatus is placed, it is more convenient to employ an elevator for removing any collection of salt from the bottom of the well $a^4$ and carrying it up to a position where it will be under the observation of the attendant who is conducting the operation of feeding the soap-lye into the receiving-vat. The expedient for this purpose (illustrated in Figs. 1 and 3) consists of the endless chain J, stretched around the guide-wheel J' in the well $a^4$ and extending vertically upward therefrom to the guide-wheels $J^2$ and $J^4$, and thence in an inclined direction to the driving sprocket-wheel $J^3$. The inclination of the upper part of the sprocket-chain is for the purpose of carrying the buckets $j$ successively into a position where they will empty their contents into the catch-tank K, which is above the receiving-vat, and which is provided with a drip pipe or chute $k$, by means of which the liquid from the catch-tank, after the salt has settled to the bottom thereof, is carried back into the receiving-vat. The catch-tank K is preferably mounted upon wheels to facilitate its removal into suitable position to enable it to discharge its solid contents into the salt-tank K'.

If desired, the soap-lye may be fed into the receiving-vat from an elevated reservoir L through the service-pipe $l$, provided near its lower end with the valve $l'$, as shown in Fig. 3. Steam for the heater is applied through the steam-pipe M, and the lower part of the heater is connected with a steam-trap $m$ in the usual manner.

It will be perceived that the described apparatus may also be employed for concentrating other solutions and separating their crystallizable from their non-crystallizable constituents—as, for example, for boiling sugar-cane juice and extracting the raw sugar therefrom and for concentrating saline liquor and crystallizing the salt therefrom.

What is claimed as the invention is—

1. In apparatus for concentrating solutions and separating their constituents, the combination of a receiving-vat and a heater connected with the bottom thereof, an evaporating-chamber elevated so far above said receiving-vat as to permit a Torricellian vacuum to be maintained in it, a pump and connections for raising liquid from said receiving-vat to said evaporating-chamber, a drain-pipe extending from the lower part of said evaporating-chamber to said heater, a condenser connected with said evaporating-chamber, and a vacuum-pump connected with said condenser, substantially as and for the purposes set forth.

2. The combination, as herein set forth, of a receiving-vat and a heater connected thereto, an evaporating-chamber elevated thirty-three feet (more or less) above said receiving-vat and containing a series of removable tanks for receiving the precipitate from the liquid under treatment, a pump and pump connections for raising said liquid from said receiving-vat to said elevated evaporating-chamber, a condenser connected with said evaporating-chamber, and a vacuum-pump connected with said condenser, as and for the purposes set forth.

3. The combination, as herein set forth, of a receiving-vat and a heater connected thereto and provided at the bottom with a well, an inclined evaporating-chamber elevated above said receiving-vat and containing a series of removable tanks for receiving the precipitate from the liquid under treatment, a pump and pipe connections for raising said liquid from said receiving-vat to said evaporating-chamber, a drain-pipe extending from the lower part of said evaporating-chamber to said heater, a chain-and-bucket elevator working in said well and extending upward therefrom through said heater and receiving-vat, a catch-tank for receiving the contents of the buckets of said elevator, a condenser connected with said evaporating-chamber, and a vacuum-pump connected with said condenser, substantially as and for the purposes set forth.

JOHN PATTEN.

Witnesses:
J. H. WHITELEGGE,
A. M. JONES.